US008961673B2

(12) United States Patent
Chopra et al.

(10) Patent No.: US 8,961,673 B2
(45) Date of Patent: Feb. 24, 2015

(54) PHASE CHANGE INK COMPOSITIONS COMPRISING DIURETHANES AS AMORPHOUS MATERIALS

(75) Inventors: Naveen Chopra, Oakville (CA); Jeffrey H. Banning, Hillsboro, OR (US); Stephan V. Drappel, Toronto (CA); Jennifer L. Belelie, Oakville (CA); Gabriel Iftime, Mississauga (CA); Kentaro Morimitsu, Mississauga (CA); Peter G. Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/457,068

(22) Filed: Apr. 26, 2012

(65) Prior Publication Data

US 2013/0284059 A1 Oct. 31, 2013

(51) Int. Cl.
*C09D 11/03* (2014.01)

(52) U.S. Cl.
USPC .................................. 106/31.61; 106/31.13

(58) Field of Classification Search
None
See application file for complete search history.

(56) References Cited

U.S. PATENT DOCUMENTS

| | | |
|---|---|---|
| 4,490,731 A | 12/1984 | Vaught |
| 4,889,560 A | 12/1989 | Jaeger et al. |
| 4,889,761 A | 12/1989 | Titterington et al. |
| 5,195,430 A | 3/1993 | Rise |
| 5,221,335 A | 6/1993 | Williams et al. |
| 5,231,135 A | 7/1993 | Machell et al. |
| 5,372,852 A | 12/1994 | Titterington et al. |
| 5,389,958 A | 2/1995 | Bui et al. |
| 5,621,022 A | 4/1997 | Jaeger et al. |
| 5,750,604 A * | 5/1998 | Banning et al. ............... 524/187 |
| 5,830,942 A | 11/1998 | King et al. |
| 6,221,137 B1 | 4/2001 | King et al. |
| 6,334,890 B1 * | 1/2002 | Goodbrand et al. ....... 106/31.43 |
| 6,472,523 B1 | 10/2002 | Banning et al. |
| 6,476,219 B1 | 11/2002 | Duff et al. |
| 6,544,591 B2 * | 4/2003 | Slone et al. .................. 427/384 |
| 6,576,747 B1 | 6/2003 | Carlini et al. |
| 6,576,748 B1 | 6/2003 | Carlini et al. |
| 6,590,082 B1 | 7/2003 | Banning et al. |
| 6,646,111 B1 | 11/2003 | Carlini et al. |
| 6,663,703 B1 | 12/2003 | Wu et al. |
| 6,673,139 B1 | 1/2004 | Wu et al. |
| 6,696,552 B2 | 2/2004 | Mayo et al. |
| 6,713,614 B2 | 3/2004 | Carlini et al. |
| 6,726,755 B2 | 4/2004 | Titterington et al. |
| 6,755,902 B2 | 6/2004 | Banning et al. |
| 6,821,327 B2 | 11/2004 | Jaeger et al. |
| 6,958,406 B2 | 10/2005 | Banning et al. |
| 7,053,227 B2 | 5/2006 | Jaeger et al. |
| 7,186,762 B2 | 3/2007 | Wong et al. |
| 7,381,831 B1 | 6/2008 | Banning et al. |
| 7,427,323 B1 | 9/2008 | Birau et al. |
| 2005/0090690 A1* | 4/2005 | Wu et al. ..................... 564/138 |

OTHER PUBLICATIONS

SciFinder Abstract from US 2005/0090690.*

* cited by examiner

*Primary Examiner* — Yun Qian
(74) *Attorney, Agent, or Firm* — Pillsbury Winthrop Shaw Pittman LLP

(57) ABSTRACT

A phase change ink composition comprising an amorphous component, a crystalline material, and optionally, a colorant, which are suitable for high speed ink jet printing, including printing on coated paper substrates. In embodiments, the amorphous component comprises a diurethane compound or derivatives thereof.

10 Claims, 3 Drawing Sheets

PHASE CHANGE INK COMPOSITIONS COMPRISING DIURETHANES AS AMORPHOUS MATERIALS

Reference is made to commonly owned and co-pending, U.S. patent application Ser. No. 13/456,619 (not yet assigned) entitled "Phase Change Ink Compositions Comprising Crystalline Diurethanes And Derivatives Thereof" to Naveen Chopra et al., electronically filed on the same day herewith; U.S. patent application Ser. No. 13/457,323 (not yet assigned) entitled "Solid Ink Compositions Comprising Crystalline Sulfone Compounds and Derivatives Thereof" to Kentaro Morimitsu et al., electronically filed on the same day herewith; U.S. patent application Ser. No. 13/457,221 (not yet assigned) entitled "Phase Change Inks Comprising Crystalline Amides" to Kentaro Morimitsu et al., electronically filed on the same day herewith; U.S. patent application Ser. No. 13/456,916 (not yet assigned) entitled "Phase Change Ink Compositions Comprising Aromatic Ethers" to Kentaro Morimitsu et al., electronically filed on the same day herewith; U.S. patent application Ser. No. 13/457,157 (not yet assigned) entitled "Fast Crystallizing Crystalline-Amorphous Ink Compositions and Methods for Making the Same" to Gabriel Iftime et al., electronically filed on the same day herewith; U.S. patent application Ser. No. 13/457,271 (not yet assigned) entitled "Rapid Solidifying Crystalline-Amorphous Inks" to Gabriel Iftime et al., electronically filed on the same day herewith; U.S. patent application Ser. No. 13/456,993 (not yet assigned) entitled "Phase Change Inks Comprising Inorganic Nucleating Agents" to Daryl W. Vanbesien et al., electronically filed on the same day herewith; U.S. patent application Ser. No. 13/456,722 (not yet assigned) entitled "Phase Change Inks Comprising Fatty Acids" to Gabriel Iftime et al., electronically filed on the same day herewith; U.S. patent application Ser. No. 13/457,300 (not yet assigned) entitled "Phase Change Inks Comprising Aromatic Diester Crystalline Compounds" to Kentaro Morimitsu et al., electronically filed on the same day herewith; U.S. patent application Ser. No. 13/456,805 (not yet assigned) entitled "Phase Change Inks Comprising Organic Pigments" to Jennifer Belelie et al., electronically filed on the same day herewith; and U.S. patent application Ser. No. 13/456,847 (not yet assigned) entitled "TROM Process for Measuring the Rate of Crystallization of Solid Inks" to Gabriel Iftime et al., electronically filed on the same day herewith, and U.S. patent application Ser. No. 13/456,679 (not yet assigned) entitled "Rapidly Crystallizing Phase Change Inks and Methods for Forming the Same" to Jennifer Belelie et al., electronically filed on the same day herewith; the entire disclosures of which are incorporated herein by reference in its entirety.

BACKGROUND

The present embodiments relate to phase change ink compositions characterized by being solid at room temperature (e.g., 20-27° C.) and molten at an elevated temperature at which the molten ink is applied to a substrate. These phase change ink compositions can be used for ink jet printing. The present embodiments are directed to a novel phase change ink composition comprising an amorphous material, a crystalline material, and optionally a colorant, and methods of making the same. The amorphous material comprises a diurethane compound and derivatives thereof.

Ink jet printing processes may employ inks that are solid at room temperature and liquid at elevated temperatures. Such inks may be referred to as solid inks, hot melt inks, phase change inks and the like. For example, U.S. Pat. No. 4,490,731, the disclosure of which is totally incorporated herein by reference, discloses an apparatus for dispensing phase change ink for printing on a recording medium such as paper. In piezo ink jet printing processes employing hot melt inks, the phase change ink is melted by the heater in the printing apparatus and utilized (jetted) as a liquid in a manner similar to that of conventional piezo ink jet printing. Upon contact with the printing recording medium, the molten ink solidifies rapidly, enabling the colorant to substantially remain on the surface of the recording medium instead of being carried into the recording medium (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

In general, phase change inks (sometimes referred to as "hot melt inks") are in the solid phase at ambient temperature, but exist in the liquid phase at the elevated operating temperature of an ink jet printing device. At the jetting temperature, droplets of liquid ink are ejected from the printing device and, when the ink droplets contact the surface of the recording medium, either directly or via an intermediate heated transfer belt or drum, they quickly solidify to form a predetermined pattern of solidified ink drops.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes or pigments, namely, cyan, magenta, yellow and black, although the inks are not limited to these four colors. These subtractive primary colored inks can be formed by using a single dye or pigment or a mixture of dyes or pigments. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording medium (for example, paper, transparency material, and the like), the droplets solidify immediately upon contact with the recording medium, so that migration of ink along the printing medium is prevented and dot quality is improved.

While the above conventional phase change ink technology is successful in producing vivid images and providing economy of jet use and substrate latitude on porous papers, such technology has not been satisfactory for coated substrates. Thus, while known compositions and processes are suitable for their intended purposes, a need remains for additional means for forming images or printing on coated paper substrates. As such, there is a need to find alternative compositions for phase change ink compositions and future printing technologies to provide customers with excellent image quality on all substrates, including selecting and identifying different classes of materials that are suitable for use as desirable ink components. There is a further need for printing these inks at high speeds as required by digital presses in production environment.

Each of the foregoing U.S. patents and patent publications are incorporated by reference herein. Further, the appropriate components and process aspects of the each of the foregoing U.S. patents and patent publications may be selected for the present disclosure in embodiments thereof.

SUMMARY

According to embodiments illustrated herein, there is provided novel phase change ink compositions comprising amorphous materials comprising diurethanes and derivatives thereof suitable for ink jet printing, including printing on coated paper substrates.

In particular, the present embodiments provide a phase change ink comprising a crystalline compound; and an amorphous diurethane compound having a formula of:

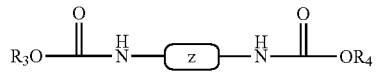

wherein Z is selected from the group consisting of

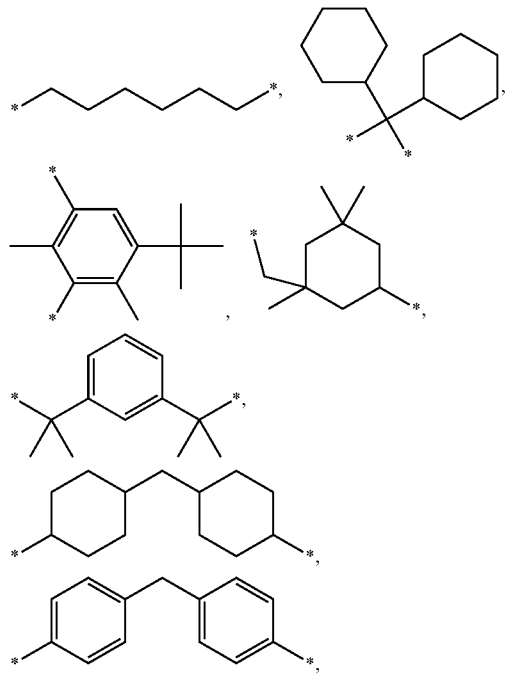

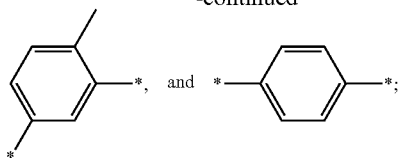

wherein each $R_3$ and $R_4$ is i) an alkyl group wherein the alkyl can be linear or branched having from about 1 to about 8 carbon atoms, or ii) an aryl group; with the proviso that when Z is $—(CH_2)_6—$, both $R_3$ and $R_4$ are not $—(CH_2)_n—C_6H_5$ wherein n=0-4; wherein the phase change ink crystallizes in less than 15 seconds.

In further embodiments, there is provided a phase change ink comprising amorphous diurethane compound; and a crystalline compound; wherein the amorphous diurethane compound is synthesized from a diisocyanate and at least one alcohol optionally in the presence of a catalyst.

In yet other embodiments, there is provided a phase change ink comprising a crystalline compound; an amorphous diurethane compound having a formula of:

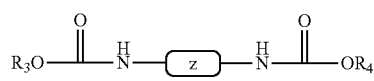

wherein Z is selected from the group consisting of

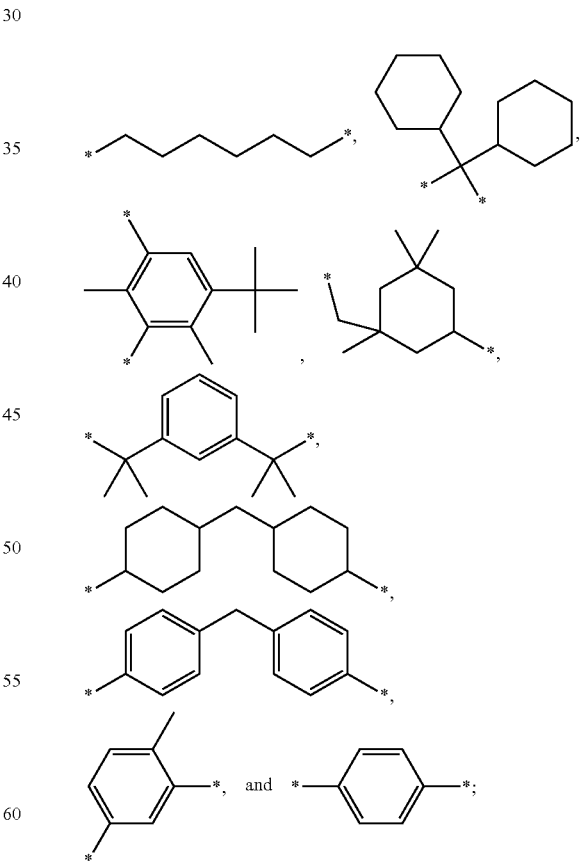

wherein each $R_3$ and $R_4$ is i) an alkyl group wherein the alkyl can be linear or branched having from about 1 to about 8 carbon atoms, or ii) an aryl group; each $R_3$ and $R_4$ is independently selected from the group consisting of

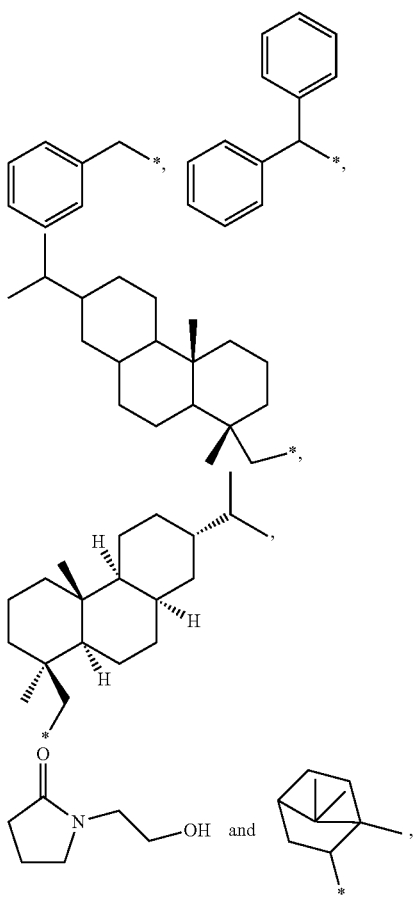

with the proviso that when Z is —(CH$_2$)$_6$—, both R$_3$ and R$_4$ are not —(CH$_2$)$_n$—C$_6$H$_6$ wherein n=0-4.

BRIEF DESCRIPTION OF THE DRAWINGS

For a better understanding of the present embodiments, reference may be had to the accompanying figures.

Figure 1:
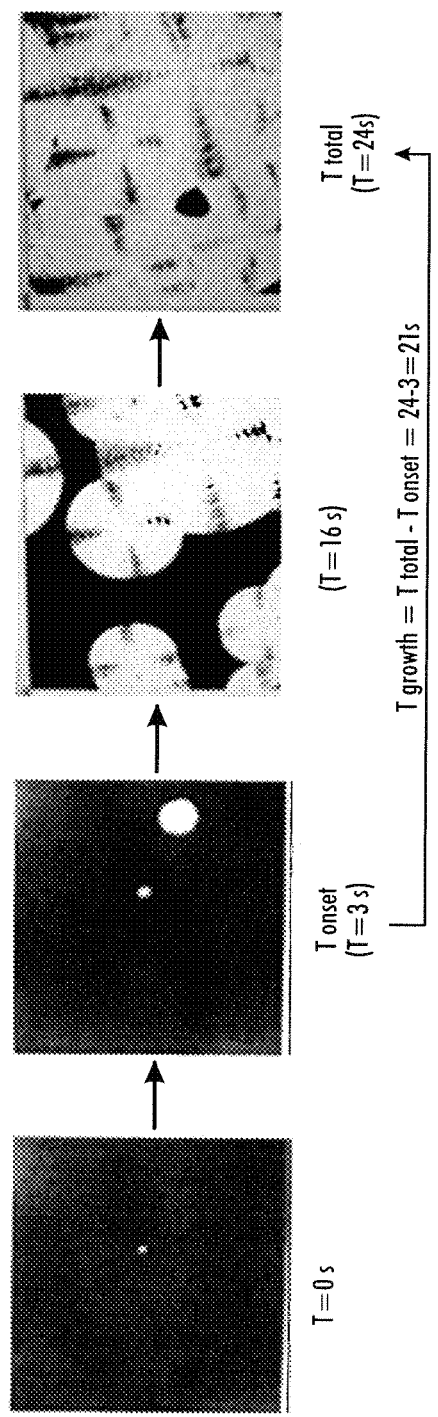
FIG. 1 illustrates the TROM process showing images of crystalline formation in an ink base from crystallization onset to crystallization completion according to an embodiment of the disclosure.

All of the rheology measurements were made on a RFS3 Rheometer (TA instruments), using a 25 mm parallel plate, at a frequency of 1 Hz; the method used was a temperature sweep from high to low temperatures, in temperature steps of 5° C., a soak (equilibration) time of 120 seconds between each temperature and at a constant frequency of 1 Hz).

DETAILED DESCRIPTION

In the following description, it is understood that other embodiments may be utilized and structural and operational changes may be made without departure from the scope of the present embodiments disclosed herein.

Phase change ink technology broadens printing capability and customer base across many markets, and the diversity of printing applications will be facilitated by effective integration of printhead technology, print process and ink materials. The phase change ink compositions are characterized by being solid at room temperature and molten at an elevated temperature at which the molten ink is applied to a substrate. As discussed above, while current ink options are successful for porous paper substrates, these options are not always satisfactory for coated paper substrates.

It was previously discovered that using a mixture of crystalline and amorphous small molecule compounds in solid ink formulations provides robust inks, and in particular, solid inks which demonstrate robust images on coated paper. (U.S. patent application Ser. No. 13/095,636 entitled "Solid Ink Compositions Comprising Crystalline-Amorphous Mixtures" to Jennifer L. Belelie et al., filed Apr. 27, 2011. Using this approach is surprising, however, due to the known properties of crystalline or amorphous materials. For crystalline materials, small molecules generally tend to crystallize when solidifying and low molecular weight organic solids are generally crystals. While crystalline materials are generally harder and more resistant, such materials are also much more brittle, so that printed matter made using a mainly crystalline ink composition is fairly sensitive to damage. For amorphous materials, high molecular weight amorphous materials, such as polymers, become viscous and sticky liquids at high temperature, but do not show sufficiently low viscosity at high temperatures. As a result, the polymers cannot be jetted from print head nozzles at desirable jetting temperature (≤140° C.). In the present embodiments, however, it is discovered that a robust solid ink can be obtained through a blend of crystalline and amorphous compounds.

Print samples made with such phase change inks demonstrate better robustness with respect to scratch, fold, and fold offset as compared to currently available phase change inks.

However, the present inventors discovered that in many cases mixtures made of crystalline and amorphous materials with optional dye colorant solidify slowly when printed on substrates from a molten state. Such slow solidifying inks are not suitable for high speed printing environments, like for example production printing, where printing at speeds higher than 100 feet per minute is required. Solidification of the ink is due to crystallization of the crystalline component in the ink when cooling.

The inventors have found that fast crystallization of a composition made of a crystalline and an amorphous component is not an inherent property of the composition.

The present embodiments provide novel phase change ink compositions comprising crystalline materials and amorphous diurethane materials which crystallize fast and are therefore suitable for high speed ink jet printing, including printing on coated paper.

The present embodiments provide a new type of ink jet phase change ink composition which comprises a blend of (1) crystalline and (2) amorphous components, generally in a weight ratio of from about 60:40 to about 95:5, respectively. In more specific embodiments, the weight ratio of the crystalline to amorphous component is from about 65:35 to about 95:5, or is from about 70:30 to about 90:10, or is from about 70:30 to about 80:20. In other embodiments, the crystalline and amorphous components are blended in a weight ratio of from about 1.5 to about 20 or from about 2.0 to about 10, respectively. Each component imparts specific properties to the phase change inks, and the blend of the components provides inks that exhibit excellent robustness on uncoated and coated substrates. The crystalline component in the ink formulation drives the phase change through rapid crystallization on cooling. The crystalline component also sets up the structure of the final ink film and creates a hard ink by reducing the tackiness of the amorphous component. The amorphous components provide tackiness and impart robustness to the printed ink.

The Amorphous Compound

The present embodiments comprise amorphous materials selected from the group of diurethane compounds and their derivatives, including linear diurethanes. The amorphous diurethanes are synthesized through one-step solvent-free reactions using commercially available diisocyanates with alcohols. This solvent-free process is low cost, avoids any byproducts and has high reactor throughput. These amorphous materials have also been found to demonstrate good phase transition as well as have specific thermal and rheological properties that make the materials suitable for use in phase change inks. For example, the hydrogen bonding sites on the urethanes offer stronger intermolecular forces than other amorphous materials, for example, diesters, which results in an ink that provides remarkable robustness, with respect to scratch, fold, and fold offset compared to currently available commercial phase change inks on the same media.

These materials show relatively low viscosity (<$10^2$ centipoise (cps), or from about 1 to about 100 cps, or from about 5 to about 95 cps) near the jetting temperature (≤140° C., or from about 100 to about 140° C., or from about 105 to about 140° C.) but very high viscosity (>$10^5$ cps) at room temperature.

The low viscosity in the jetting range (100-140° C.) provides high formulation latitude. The high viscosity at room temperature imparts robustness. These characteristics make the materials good candidates for the amorphous component. Moreover, the diurethanes and their derivatives are synthesized from commercially available materials, thus, reducing the costs of the phase change inks.

The amorphous diurethane of the present disclosure has the following formula:

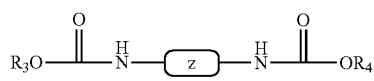

wherein Z is selected from the group consisting of:

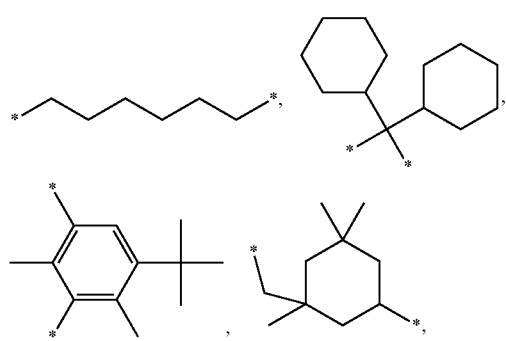

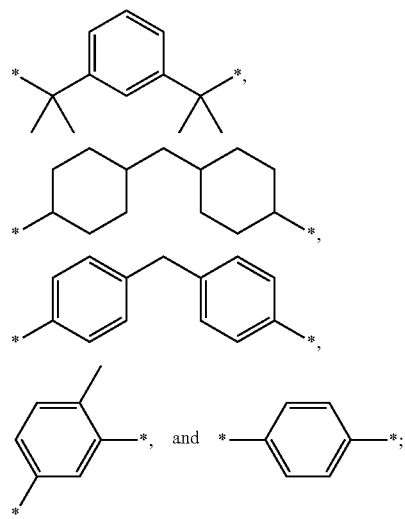

and wherein Z can be attached to either side of the nitrogen atom of the diurethane formula through the bond labeled with *; each $R_3$ and $R_4$ is i) an alkyl group wherein the alkyl can be linear or branched having from about 1 to about 8 carbon atoms, or ii) an aryl group; with the proviso that when Z is —$(CH_2)_6$—, both $R_3$ and $R_4$ are not —$(CH_2)_n$—$C_6H_5$ wherein n=0-4. Each $R_3$ and $R_4$ can be any linear or branched alkyl including methyl, ethyl, propyl, (n-, iso-, sec- and t-) butyl, (n-, iso-, t- and the like) pentyl, (n-, iso-, t- and the like) hexyl, (n-, iso-, t- and the like) heptyl, or (n-, iso-, t- and the like) octyl.

In certain embodiments, $R_3$ and $R_4$ is independently selected from the group consisting of:

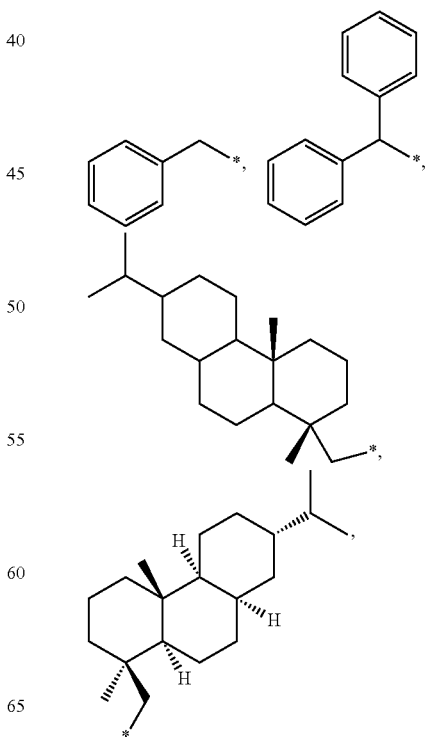

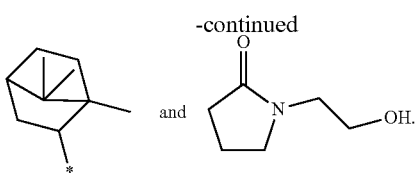

with the proviso that when Z is —(CH$_2$)$_6$—, both R$_3$ and R$_4$ are not —(CH$_2$)$_n$—C$_6$H$_6$ wherein n=0-4.

In certain embodiments, z is —(CH$_2$)$_6$— and both R$_3$ and R$_4$ are

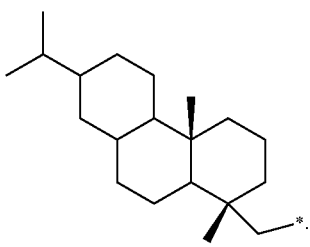

R$_3$ and R$_4$ can also be fused ring alcohols, hydroabietyl alcohol (e.g. rosin alcohols), isoborneol, and ethoxylated nonylphenol (such as Igepal CA210, from Rhodia).

The Crystalline Compound

In combination with the amorphous materials of the present embodiments, crystalline materials are also used.

Suitable crystalline components include those disclosed in U.S. patent application Ser. No. 13/456,619 to Chopra et al., entitled "Phase Change Ink Compositions Comprising Diurethanes and Derivatives Thereof," which is hereby incorporated by reference in its entirety. These crystalline materials comprise diurethanes having a general formula:

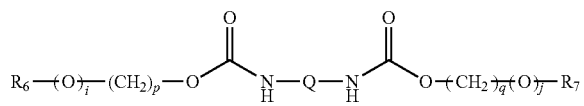

wherein Q is alkanediyl; each R$_6$ and R$_7$ is independently phenyl or cyclohexyl optionally substituted with one or more alkyl; i is 0 or 1; j is 0 or 1; p is 1 to 4; q is 1 to 4. In certain of such embodiments, each R$_6$ and R$_7$ is independently phenyl or cyclohexyl optionally substituted with one or more methyl or ethyl. In certain of such embodiments, R$_6$ and R$_7$ is phenyl.

In certain embodiments, Q is —(CH$_2$)$_n$— and n is 4 to 8. In certain of such embodiments, n is 6.

Crystalline diurethane compounds can be synthesized by the general scheme shown below:

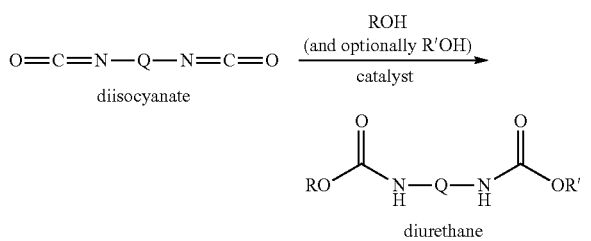

wherein R is —(CH$_2$)$_p$—(O)$_i$—R$_6$, and R' is —(CH$_2$)$_q$—(O)$_j$—R$_7$

Suitable alcohols (ROH or R'OH) for use in the disclosure include but not limited to benzyl alcohol, 2-phenylethanol, 2-phenoxyethanol, 3-phenylpropan-1-ol, hydrocinnamyl alcohol, cinnamyl alcohol, C$_6$H$_5$(CH$_2$)$_4$OH, cyclohexanol, 2-methylcyclohexanol, 3-methylcyclohexanol, 4-methylcyclohexanol, cyclohexylmethanol; 2-methylcyclohexylmethanol, 3-methylcyclohexylmethanol, 4-methylcyclohexylmethanol, and 4-ethylcyclohexanol. Each ROH and R'OH is independently selected from the listed disclosed above.

Or, each R and R' (or each R$_6$ and R$_7$) is independently selected from benzyl, 2-phenylethyl, 2-phenoxyethyl, hydrocinnamyl, cinnamyl, C$_6$H$_5$(CH$_2$)$_4$—, cyclohexyl, 2-methylcyclohexyl, 3-phenylpropanyl, 3-methylcyclohexyl, 4-methylcyclohexyl, cyclohexylmethyl, 2-methylcyclohexylmethyl, 3-methylcyclohexylmethyl, 4-methylcyclohexylmethyl, and 4-ethylcyclohexanyl.

The above reaction may be conducted by combining diisocyanate and alcohol in the melt in the presence of a tin catalyst, such as, dibutyl tin dilaurate (Fascat 4202), dibutyl tin oxide (Fascat 4100); a zinc catalyst, such as Bi cat Z; or a bismuth catalyst, such as Bi cat 8124; Bi cat 8108. Only trace quantities of catalyst are required for the process. The relatively fast formation of diurethanes in a solvent-free process represents a significant improvement over the previous synthesis of crystalline components. In addition, the solvent-free process eliminates problems with byproducts and also means higher reactor throughput.

The crystalline materials show sharp crystallization, relatively low viscosity (≤10$^1$ centipoise (cps), or from about 0.5 to about 20 cps, or from about 1 to about 15 cps) at a temperature of about 140° C., but very high viscosity (>10$^6$ cps) at room temperature. These materials have a melting temperature (T$_{melt}$) of less than 150° C., or from about 65 to about 150° C., or from about 66 to about 145° C., and a crystallization temperature (T$_{crys}$) of greater than 60° C., or from about 60 to about 140° C., or from about 65 to about 120° C. The ΔT between T$_{melt}$ and T$_{crys}$ is less than about 55° C.

The crystalline and amorphous materials of the present embodiments were found to be miscible with one another and the resulting ink compositions formulated with the crystalline and amorphous materials show good rheological profiles. Image samples created by the phase change ink composition on coated paper by K-proof exhibit excellent robustness. A K-proofer is a common test fixture in a print shop.

The present embodiments comprise a balance of amorphous and crystalline materials to realize a sharp phase transition from liquid to solid and facilitate hard and robust printed images, while maintaining a desired level of viscosity. Prints made with this ink demonstrated advantages over commercially available inks, such as for example, better robustness against scratch. Thus, the present diurethane compounds and derivatives thereof, which provide amorphous components for the phase change inks, have been discovered to produce robust inks having desirable rheological profiles and that meet the many requirements for inkjet printing.

In embodiments, the crystalline material is present an amount of from about 60 percent to about 95 percent by weight, or from about 65 percent to about 95 percent by weight, or from about 70 percent to about 90 percent by weight of the total weight of the ink composition. In embodiments, the amorphous material is present in an amount of from about 5 percent to about 40 percent by weight, or from about 5 percent to about 35 percent by weight, or from about 10 percent to about 30 percent by weight of the total weight of the ink composition.

In embodiments, in the molten state, the resulting solid ink has a viscosity of from about 1 to about 22 cps, or from about 4 to about 15 cps, or from about 6 to about 12 cps, at a the jetting temperature. The jetting temperature is typically comprised in a range from about 100° C. to about 140° C. In embodiments, the solid ink has a viscosity of about >10$^6$ cps, at room temperature. In embodiments, the solid ink has a $T_{melt}$ of from about 65 to about 140° C., or from about 70 to about 140° C., from about 80 to about 135° C. and a $T_{crys}$ of from about 40 to about 140° C., or from about 45 to about 130° C., from about 50 to about 120° C., as determined by DSC at a rate of 10° C./min.

The present inventors have discovered specific diurethane compounds that are meet the requirements for use as the amorphous material in phase change ink compositions. The primary requirement for phase change ink is that it is in the liquid state at jetting temperature (typically from about 100 to about 140° C.) and solid state at room temperature. The suitable diurethane candidates can be synthesized by the general reaction scheme shown below:

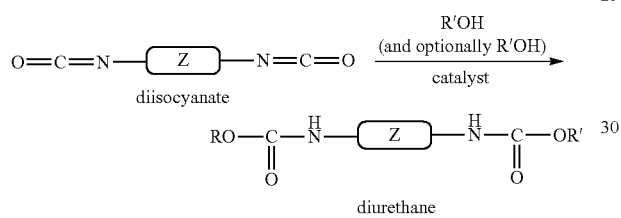

wherein R is —(CH$_2$)$_p$—(O)$_i$—R$_5$, and R' is —(CH$_2$)$_q$—(O)$_j$—R$_6$.

The above reaction was conducted by combining diisocyanate and alcohol in the melt in the presence of a tin catalyst, such as, dibutyl tin dilaurate (Fascat 4202), dibutyl tin oxide (Fascat 4100); zinc catalysts such as Bi cat Z; or bismuth catalysts such as Bi cat 8124; Bi cat 8108. Only trace quantities of catalyst are required for the process. Suitable diisocyanates such as 1,6-hexamethylenediisocyanate, isophoronediisocyanate, 1,3-bis(isocyanatomethyl)cyclohexane, m-tetramethyl xylylene diisocyanate, dicyclohexylmethane diisocyanate and 2,4,4-trimethylhexamethylene diisocyanate, (hexamethylene-1,6-diisocyanate (HDI); trimethylhexamethylene diisocyanate (TMHDI); 2,5-bis-isocyanatomethylene diisocyanate, tetramethylxylene diisocyanate (TMXDI); isophorone diisocyanate (IP DI), diphenylmethane-4,4'-diisocyanate (MDI); hydrogenated diphenylmethane-4,4'-diisocyanate (H$_{12}$MDI); phenylisocyanate; toluene diisocyanate (TDI), phenylene diisocyanate may be used. Various diisocyanates were used in the preparation of the amorphous diurethanes, including: 1,6-hexamethylenediisocyanate (HDI), isophoronediisocyanate (IPDI), 1,3-bis (isocyanatomethyl)cyclohexane (BIMC), m-tetramethyl xylylene diisocyanate (TMXDI), dicyclohexylmethane diisocyanate (H12MDI) and 2,4,4-trimethylhexamethlene diisocyanate (TMHDI). These diisocyanates were chosen based on wide commercial availability and low cost.

The relatively fast formation of diurethanes in a solvent-free process represents a significant improvement over the previous synthesis of amorphous components. In addition, the solvent-free process eliminates problems with byproducts and also means higher reactor throughput. As can be seen, the nature of the endgroup alcohol impacts the Tg and viscosity properties of the resulting urethane formed. It is believed that function-hydrogen-bonding sites on the urethanes may offer stronger intermolecular forces than other amorphous components, such as diesters, for providing an ink capable of a more robust image.

Several suitable diurethanes were prepared by using a variety of alcohols and diisocyanates as shown in Tables 1 and 2.

TABLE 1

| Alcohol # | Structure | Name |
|---|---|---|
| 1 | (structure) | Benzhydrol |
| 2 | (structure) | Abitol E |

TABLE 2

| Diisocyanate # | Structure | Name |
|---|---|---|
| 1 | (structure) | 1,6-hexamethylen-diisocyanate (HDI) |
| 2 | (structure) | Dicyclohexyl-methane diisocyanate (H12MDI) |

TABLE 2-continued

| Diisocyanate # | Structure | Name |
|---|---|---|
| 3 | | 2,4,4-trimethylhexa-methylenediisocyanate (TMHDI) |
| 4 | | m-tetramethylxylylene diisocyanate (TMXDI) |
| 5 | | 1,3-bis(iisocyanato-methyl)cyclohexane (BIMC) |
| 6 | | Isophoronoe diisocyanate (IPDI) |

Typically, the amorphous material has a Tg range from about −20° C. to about 50° C. Materials with a Tg below room temperature will be tacky or runny materials that flow at room temperature. Conversely, materials with a Tg above room temperature will be brittle and hard materials. The general trend is that the higher the Tg, the higher the viscosity of the material. While the structural activity relationships are not fully understood, it is known that the Tg of isocyanate derived resins is controlled by the proper choice of alcohol and diisocyanate starting materials. Varying one or more of the alcohols and isocyanates will permit custom tailoring of the Tg properties of the amorphous resin product.

The ink of embodiments may further include conventional additives to take advantage of the known functionality associated with such conventional additives. Such additives may include, for example, at least one antioxidant, defoamer, slip and leveling agents, clarifier, viscosity modifier, adhesive, plasticizer and the like.

The ink may optionally contain antioxidants to protect the images from oxidation and also may protect the ink components from oxidation while existing as a heated melt in the ink reservoir. Examples of suitable antioxidants include N,N'-hexamethylene bis(3,5-di-tert-butyl-4-hydroxy hydrocinnamamide) (IRGANOX 1098, available from BASF), 2,2-bis (4-(2-(3,5-di-tert-butyl-4-hydroxyhydrocinnamoyloxy)) ethoxyphenyl)propane (TOPANOL-205, available from Vertellus), tris(4-tert-butyl-3-hydroxy-2,6-dimethyl benzyl)isocyanurate (Aldrich), 2,2'-ethylidene bis(4,6-di-tert-butylphenyl)fluoro phosphonite (ETHANOX-398, available from Albermarle Corporation), tetrakis(2,4-di-tert-butylphenyl)-4,4'-biphenyl diphosphonite (ALDRICH 46), pentaerythritol tetrastearate (TCI America), tributylammonium hypophosphite (Aldrich), 2,6-di-tert-butyl-4-methoxyphenol (Aldrich), 2,4-di-tert-butyl-6-(4-methoxybenzyl)phenol (Aldrich), 4-bromo-2,6-dimethylphenol (Aldrich), 4-bromo-3,5-didimethylphenol (Aldrich), 4-bromo-2-nitrophenol (Aldrich), 4-(diethyl aminomethyl)-2,5-dimethylphenol (Aldrich), 3-dimethylaminophenol (Aldrich), 2-amino-4-tert-amylphenol (Aldrich), 2,6-bis(hydroxymethyl)-p-cresol (Aldrich), 2,2'-methylenediphenol (Aldrich), 5-(diethylamino)-2-nitrosophenol (Aldrich), 2,6-dichloro-4-fluorophenol (Aldrich), 2,6-dibromo fluoro phenol (Aldrich), α-trifluoro-o-cresol (Aldrich), 2-bromo-4-fluorophenol (Aldrich), 4-fluorophenol (Aldrich), 4-chlorophenyl-2-chloro-1,1,2-trifluoroethyl sulfone (Aldrich), 3,4-difluoro phenylacetic acid (Adrich), 3-fluorophenylacetic acid (Aldrich), 3,5-difluoro phenylacetic acid (Aldrich), 2-fluorophenylacetic acid (Aldrich), 2,5-bis (trifluoromethyl) benzoic acid (Aldrich), ethyl-2-(4-(4-(trifluoromethyl)phenoxy)phenoxy)propionate (Aldrich), tetrakis (2,4-di-tert-butyl phenyl)-4,4'-biphenyl diphosphonite (Aldrich), 4-tert-amyl phenol (Aldrich), 3-(2H-benzotriazol-2-yl)-4-hydroxy phenethylalcohol (Aldrich), NAUGARD 76, NAUGARD 445, NAUGARD 512, AND NAUGARD 524 (manufactured by Chemtura Corporation), and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

In embodiments, the phase change ink compositions described herein may also include a colorant. Any desired or effective colorant can be employed in the phase change ink compositions, including dyes, pigments, mixtures thereof, and the like, provided that the colorant can be dissolved or dispersed in the ink carrier. Any dye or pigment may be chosen, provided that it is capable of being dispersed or dissolved in the ink carrier and is compatible with the other ink components. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Pylam Products); Direct Brilliant Pink B (Oriental Giant Dyes); Direct Red 3BL ($C_1$.assic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanone Yellow 2G (Classic Dyestuffs); Orasol Black RLI (BASF); Orasol Black CN (Pylam Products); Savinyl Black RLSN(Clariant); Pyrazol Black BG (Clariant); Morfast Black 101 (Rohm & Haas); Diaazol Black RN (ICI); Thermoplast Blue 670 (BASF); Orasol Blue GN (Pylam Products); Savinyl Blue GLS (Clariant); Luxol Fast Blue MBSN (Pylam Products); Sevron Blue 5GMF (Classic Dyestuffs); Basacid Blue 750 (BASF); Keyplast Blue (Keystone Aniline Corporation); Neozapon Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen Blue FF-4012 (BASF); Lampronol Black BR(C.I. Solvent Black 35) (ICI); Morton Morplas Magenta 36 (C.I. Solvent Red 172); metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, Solvent Yellow 162, Acid Red 52, Solvent Blue 44, and uncut Reactint Violet X-80.

Pigments are also suitable colorants for the phase change inks. Examples of suitable pigments include PALIOGEN Violet 5100 (BASF); PALIOGEN Violet 5890 (BASF); HELIOGEN Green L8730 (BASF); LITHOL Scarlet D3700 (BASF); SUNFAST Blue 15:4 (Sun Chemical); Hostaperm Blue B2G-D (Clariant); Hostaperm Blue B4G (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue K6902, K6910 (BASF); SUNFAST Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue GLO (BASF); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991K (BASF); PALIOTOL Yellow 1840 (BASF); NOVOPERM Yellow FGL (Clariant); Ink Jet Yellow 4G VP2532 (Clariant); Toner Yellow HG (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

Pigment dispersions in the ink base may be stabilized by synergists and dispersants. Generally, suitable pigments may be organic materials or inorganic.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are incorporated herein by reference in their entirety.

In embodiments, solvent dyes are employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Pylam Products); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow 5RA EX (Classic Dyestuffs); Orasol Black RLI (BASF); Savinyl Black RLS (Clariant); Morfast Black 101 (Rohm and Haas); Orasol Blue GN (Pylam Products); Thermoplast Blue 670 (BASF); Savinyl Blue GLS (Sandoz); Luxol Fast Blue MBSN (Pylam); Sevron Blue 5GMF (Classic Dyestuffs); Basacid Blue 750 (BASF); Keyplast Blue E (Keystone Aniline Corporation); Neozapon Black X51 (C.I. Solvent Black, C.I. 12195) (BASF); Sudan Blue 670 (C.I. 61554) (BASF); Sudan Yellow 146 (C.I. 12700) (BASF); Sudan Red 462 (C.I. 260501) (BASF), mixtures thereof and the like.

The colorant may be present in the phase change ink in any desired or effective amount to obtain the desired color or hue such as, for example, at least from about 0.1 percent by weight of the ink to about 50 percent by weight of the ink, at least from about 0.2 percent by weight of the ink to about 20 percent by weight of the ink, and at least from about 0.5 percent by weight of the ink to about 10 percent by weight of the ink.

In embodiments, in the molten state, the ink carriers for the phase change inks may have a viscosity of from about 1 to about 22 cps, or from about 4 to about 15 cps, or from about 6 to about 12 cps, at a the jetting temperature. The jetting temperature is typically comprised in a range from about 100° C. to about 140° C. In embodiments, the solid ink has a viscosity of about >$10^6$ cps, at room temperature. In embodiments, the solid ink has a $T_{melt}$ of from about 65 to about 140° C., or from about 70 to about 140° C., from about 80 to about 135° C. and a $T_{crys}$ of from about 40 to about 140° C., or from about 45 to about 130° C., from about 50 to about 120° C., as determined by DSC at a rate of 10° C./min.

The ink compositions can be prepared by any desired or suitable method. For example, each of the components of the ink carrier can be mixed together, followed by heating, the mixture to at least its melting point, for example from about 60° C. to about 150° C., 80° C. to about 145° C. and 85° C. to about 140° C. The colorant may be added before the ink ingredients have been heated or after the ink ingredients have been heated. When pigments are the selected colorants, the molten mixture may be subjected to grinding in an attritor or ball mill apparatus or other high energy mixing equipment to affect dispersion of the pigment in the ink carrier. The heated mixture is then stirred for about 5 seconds to about 30 minutes or more, to obtain a substantially homogeneous, uniform melt, followed by cooling the ink to ambient temperature (typically from about 20° C. to about 25° C.). The inks are solid at ambient temperature. In a specific embodiment, during the formation process, the inks in their molten state are poured into molds and then allowed to cool and solidify to form ink sticks. Suitable ink preparation techniques are disclosed in U.S. Pat. No. 7,186,762, the disclosure of which is incorporated herein by reference in its entirety.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Such robust inks may be used with printing equipment at high speeds. Typically, production digital presses print at a speed comprised from about 100 to 500 or more feet/minute. This requires inks which are capable of solidifying very fast once placed onto the paper, in order to prevent offset of the printed image during fast printing process, where printed paper is either stacked (cut-sheet printers) or rolled (continuous feed printers). Fast crystallization is not a general or inherent property of crystalline-amorphous robust inks. Therefore not all crystalline-amorphous inks are suitable for fast printing. The present inventors have discovered specific crystalline amide compounds which when used in conjunction with specific amorphous compounds provide fast crystallization, therefore enabling fast printing.

In order to evaluate the suitability of a test ink for fast printing a quantitative method for measuring the rates of crystallization of solid inks containing crystalline components was developed. TROM (Time-Resolved Optical Microscopy) enables comparison between various test samples and, as a result, is a useful tool for monitoring the progress made with respect to the design of fast crystallizing inks.

TROM is described in co-pending U.S. patent application Ser. No. 13/456,847 (not yet assigned) entitled "TROM Process for Measuring the Rate of Crystallization of Solid Inks" to Gabriel Mime et al., electronically filed on the same day herewith, Time Resolved Optical Microscopy (TROM) monitors the appearance and the growth of crystals by using Polarized Optical Microscopy (POM). The sample is placed between crossed polarizers of the microscope. Crystalline materials are visible because they are birefringent. Amorphous materials or liquids, similar to, for example, inks in their molten state that do not transmit light, appear black under POM. Thus, POM enables an image contrast when viewing crystalline components and allows for pursuing crystallization kinetics of crystalline-amorphous inks when cooled from the molten state to a set-temperature. Polarized optical microscopy (POM) enables exceptional image contrast when viewing crystalline components.

In order to obtain data that allow comparison between different and various samples, standardized TROM experimental conditions were set, with the goal of including as many parameters relevant to the actual printing process. The ink or ink base is sandwiched between 16-25 mm circular thin glass slides of a thickness of 0.2 mm to 0.5 mm. The thickness of the ink layer is kept at 5-25 µm (controlled with fiberglass spacers) which is close to actual printed ink layers. For rate of crystallization measurement, the sample is heated to the expected jetting temperature (viscosity of about 10-12 cps) via an offline hotplate and then transferred to a cooling stage coupled with an optical microscope. The cooling stage is thermostated at a preset temperature which is maintained by controlled supply of heat and liquid nitrogen. This experimental set-up models the expected drum/paper temperature onto which a drop of ink would be jetted in real printing process (40° C. for the experiments reported in this disclosure). Crystal formation and growth is recorded with a camera.

The key steps in the TROM process are illustrated in FIG. 1, highlighting the key steps in the measuring process with the mainline ink base which contains just amorphous and crystalline components (no dye or pigment). When viewed under POM, the molten and at time zero, the crystalline-amorphous inks appear black as no light is passed through. As the sample crystallizes, the crystalline areas appear brighter. The numbers reported by TROM include: the time from the first crystal (crystallization onset) to the last (crystallization completion).

The definition of key measured parameters of the TROM process are set forth below:

Time zero (T=0 s)—the molten sample is placed on the cooling stage under microscope T onset=the time when the first crystal appears T growth=the duration of the crystal growth from the first crystal (T onset) to the completion of the crystallization (T total)

T total=T onset+T growth

It should be understood that the crystallization times obtained with the TROM method for selected inks are not identical to what would be the crystallization times of a droplet of ink in an actual printing device. In an actual printing device such as a printer, the ink solidifies much faster. We determined that there is a good correlation between the total crystallization time as measured by the TROM method and the solidification time of an ink in a printer. In the standardized conditions described above, we determined that inks solidify within 10-15 seconds or less measured by the TROM method, are suitable for fast printing, typically at speeds from 100 feet/minute or higher. Therefore, for the purpose of the present disclosure, a rate of crystallization lower than 15 seconds, are considered to be fast crystallizing.

In certain embodiments, the phase change ink crystallizes in less than 15 seconds.

Any suitable substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Elite Gloss, Sappi Warren Papers LUSTROGLOSS, specialty papers such as Xerox DURAPAPER, and the like, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Synthesis of Diurethane Compound 1 from HDI and Abitol E

A 250 mL vessel equipped with a stir magnet was charged 50.3 g Abitol E (available from Eastman Corporation) (4.8% OH content, calculated Mw=354 g/mol, 339 mmol) and 1 drop Fascat 4202 catalyst. The jar was placed in an about 130° C. oil bath. 11.4 g HDI (MW=168 g/mol, 169 mmol) was then added. An exotherm was observed. Infrared (IR) was checked after 1 hr of reaction. The IR showed no isocyanate peak at ca. 2265 cm$^{-1}$, indicating that the reaction was complete. The reaction contents were poured into a tin pan to cool and solidify as a glassy amorphous solid.

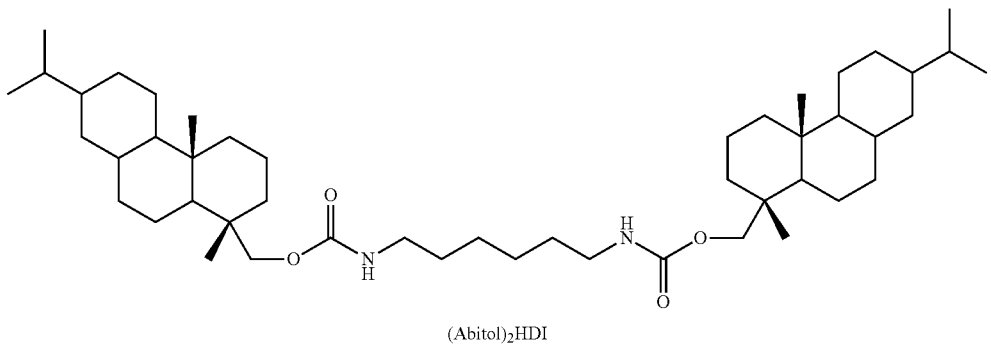 [SMILES: CC(C)C1CCC2C(CCC3[C@@](C)(COC(=O)NCCCCCCNC(=O)OC[C@]4(C)CCC[C@]5(C)C6CCC(C(C)C)CC6CCC45)CCC[C@@]23C)C1]

(Abitol)$_2$HDI

Example 2

Synthesis of Diurethane Compound 2 from BIMC and Benzhydrol

A 100 mL vessel equipped with a stir magnet was charged 9 g benzhydrol (available from Aldrich) (Mw=184 g/mol, 652 mmol) and 1 drop of Fascat 4202 catalyst. The jar was placed in an about 130° C. oil bath. 4.7 g BIMC (Mw=194 g/mol, 326 mmol) was then added. An exotherm was observed. IR was checked after 1 hr of reaction. The IR showed no isocyanate peak at ca. 2265 cm$^{-1}$, indicating that the reaction was complete. The reaction contents were poured into a tin pan to cool and solidify as a glassy amorphous solid.

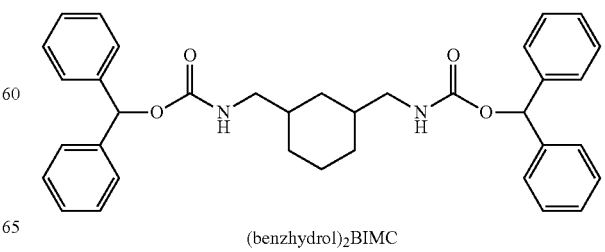

(benzhydrol)$_2$BIMC

Example 3

Synthesis of Diurethane Compound 3 from TMXDI and Benzyl Alcohol

A 100 mL vessel equipped with a stir magnet was charged 13.0 g benzyl alcohol (available from Aldrich) (Mw=108 g/mol, 1.111 mmol) and 1 drop of Fascat 4202 catalyst. The jar was placed in an about 130° C. oil bath. 14.6 g TMXDI (Mw=244 g/mol, 555 mmol) was then added. An exotherm was observed. IR was checked after 1 hr of reaction. The IR of a sample from the reaction mixture showed an isocyanate peak so an additional 0.5 grams of benzyl alcohol were added and allowed to react for 30 minutes. The IR of a sample from the reaction mixture still showed an isocyanate peak so an additional 1.0 grams of benzyl alcohol were added and allowed to react for an additional 30 minutes. The IR of a sample from the reaction mixture showed no isocyanate peak at ca. 2265 cm$^{-1}$ indicating that the reaction was complete. The reaction contents were poured into a tin pan to cool and solidify as an amorphous solid.

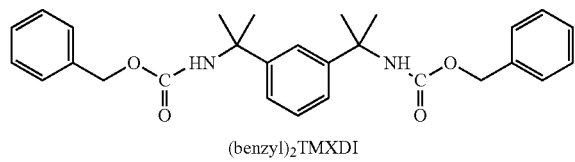 [SMILES: CC(C)(NC(=O)OCc1ccccc1)c1cccc(C(C)(C)NC(=O)OCc2ccccc2)c1]

(benzyl)$_2$TMXDI

Figure 2:
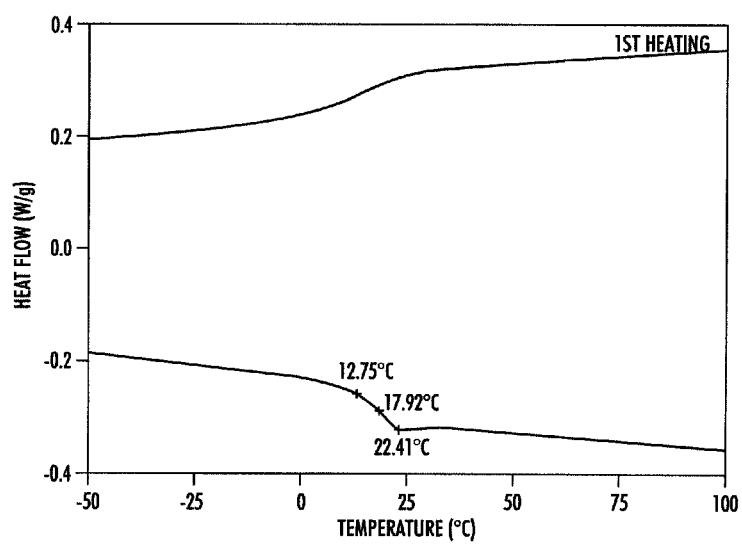
FIG. 2 is differential scanning calorimetry (DSC) data of (Abitol)$_2$1,6-hexamethylendiisocyanate [(Abitol)$_2$HDI] confirming the amorphous properties according to the present embodiments (the DSC data was obtained on a Q1000 Differential Scanning calorimeter (TA Instruments) at a rate of 10° C./min from −50 to 150 to −50° C.)

Characterization of Amorphous Diurethane Compound 1 and Inks Containing the Same As shown in FIG. 2, Diurethane Compound 1 was characterized by measurement of the $T_g$ (glass transition temperature) using a DSC technique on a TA instruments DSC Q1000 with a rate of heating/cooling of 10° C./min. Table 3 summarizes the $T_g$ data for Diurethane Compounds 1, 2, and 3. As can be seen, the data in Table 3 further supports the utility of these materials as amorphous resins.

TABLE 3

| Diurethane Compound | Tg/° C. |
|---|---|
| 1. (Abitol)$_2$-HDI | 17.9 |
| 2. (benzhydrol)$_2$-BIMC | 15.82 |
| 3. (benzyl)$_2$-TMXDI | 0.41 |

Figure 3:
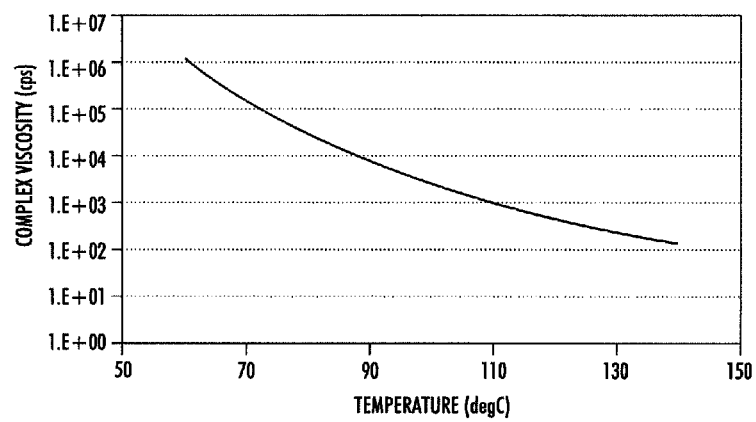
FIG. 3 is a graph illustrating rheology data of (Abitol)$_2$HDI.

The rheology of Diurethane Compound 1 was also measured, and shown in FIG. 3, using an RFS3 controlled strain Rheometer (TA instruments) equipped with a Peltier heating plate and using a 25 mm parallel plate. The method used was a temperature sweep from high to low temperatures, in temperature steps of 5° C., a soak (equilibration) time of 120 seconds between each temperature and at a constant frequency of 1 Hz.

One sample ink was prepared containing an 80:20 blend of a crystalline diurethane compound, dibenzyl hexane-1,6-diyldicarbamate, previously disclosed in U.S. patent application Ser. No. 13/456,619 to Chopra et al., entitled "Phase Change Ink Compositions Comprising Diurethanes and Derivatives Thereof," and amorphous Diurethane Compound 1. The ink formulation is shown in Table 4.

TABLE 4

| Component | Wt % | Mass/g |
|---|---|---|
| dibenzyl hexane-1,6-diyldicarbamate | 78.4 | 3.92 |
| (Abitol)$_2$HDI diurethane | 19.6 | 0.98 |
| Solvent Blue 101 (Keyplast Blue E) | 2.0 | 0.1 |
| TOTAL | 100% | 5.0 g |

To prepare the sample ink, crystalline and amorphous resins and dye were added to a 25 mL bottle with a stir bar. The mixture was heated to 140° C. in a heating block with stirring for 1 hour, then the molten mixture was poured into a foil pan to cool and solidify.

Ink Characterization

Figure 4:
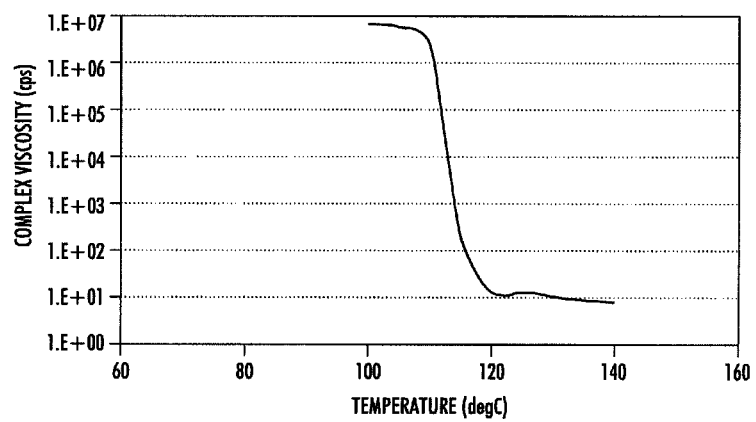
FIG. 4 is a graph illustrating rheology data of an ink sample comprising (Abitol)$_2$HDI made according to the present embodiments.

The rheology of the Ink was measured, as shown in FIG. 4, using an RFS3 controlled strain Rheometer (TA instruments) equipped with a Peltier heating plate and using a 25 mm parallel plate.

Comparative data for this ink and two commercially available inks were obtained for crystallization and are shown in Table 6 below. Rate of crystallization was measured by Time-Resolved Optical Microscopy (TROM) procedure.

TROM results are shown in Table 5 for a fast ink (Commercial Ink A), for a slow ink (Commercial Ink B) and for the ink described in Table 4. This example demonstrates that fast crystallizing inks can be designed by using amorphous diurethane components. Fast crystallization of crystalline-amorphous inks containing amorphous diurethanes is not necessarily an inherent property of the amorphous urethane. Ultimately the rate of crystallization will depend on the selection of the pair of amorphous and crystalline components. In this way it is possible to tune the rate of crystallization of such inks within desired ranges between slow and fast crystallization rates. Both fast and slow inks may be desired since each has benefits. Fast crystallizing inks enable high speed printing. One potential benefit of slower crystallizing inks may be deeper penetration into the paper which may provide improved image robustness.

TABLE 5

| Ink | Test Temp. | T onset (sec) | T grow (sec) | T total (sec) |
|---|---|---|---|---|
| Commercial Ink A | 110 | 2 | 2 | 4 |
| Commercial Ink B | 120 | 7 | 29 | 36 |
| Ink with amorphous diurethane disclosed here | 120 | 2 | 6 | 8 |

Correlation experiments conducted with a web-fed printer have shown that an ink which shows a total crystallization time of about 4 seconds like Commercial Ink A is suitable for printing at fast speed, while an ink which in TROM procedure takes about over 20 seconds is too slow to allow fast printing rate as required by next generation printers. Inks with a crystallization time close to 15 seconds or less are expected to be suitable for fast printing. As seen from the data presented, one of the benefits of the present embodiments is that there is provided a robust ink which also is a fast printing ink. Neither of the two comparative commercial inks meets both requirements. For example, Commercial Ink A provides fast print but poor robustness while Commercial Ink B provides good robustness but with slow printing.

Robustness Performance

Image samples created by the phase change ink composition on coated paper by K-proof exhibit excellent robustness. As stated above, a K-proofer is a common test fixture in a print shop. In this case the proofer has been modified to heat the printing plate to melt the phase change ink. The K-Proofer used has three rectangular gravure patterns each approximately 9.4×4.7 cm. The cell density of the first rectangle is nominally 100%, the second 80%, and the third 60%. In practice this K-proof plate results in films (or pixels) of about 5 microns in thickness (or height). Test ink is spread over the heated gravure plate and a test print is made by passing a wiping blade across the plate surface immediately follow by a rubber roll upon which a test paper has been secured. As the paper roll passes ink is transferred from the gravure cells to the paper.

K-proof analyses showed superior scratch resistance of Ink when compared to commercially available inks, such as Commercial Ink A and Commercial Ink B, and comparable fold crease and fold offset when compared to the same commercially available inks.

In summary, the present embodiments provide robust phase change ink formulations developed for inkjet printing which contains at least one crystalline material and at least one amorphous material. The inks may also include a colorant, such as a pigment or dye. The amorphous materials are selected diurethane compounds which have demonstrated to have suitable properties for use as the amorphous component in phase change ink compositions and are miscible with the crystalline materials. The amorphous materials have desirable physical properties which provide for inks having improved robustness against scratch, fold offset and fold crease as compared to other commercially available phase change inks.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A phase change ink comprising:
a crystalline compound having a formula of:

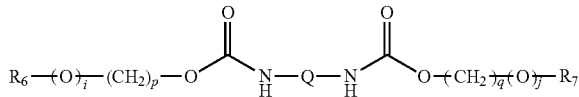

wherein Q is alkanediyl; each $R_6$ and $R_7$ is independently phenyl or cyclohexyl optionally substituted with one or more alkyl; i is 0 or 1; j is 0 or 1; p is 1 to 4; q is 1 to 4, further wherein the crystalline compound is present in an amount of from 60 percent to 95 percent by weight of the total weight of the phase change ink; and
an amorphous diurethane compound comprises

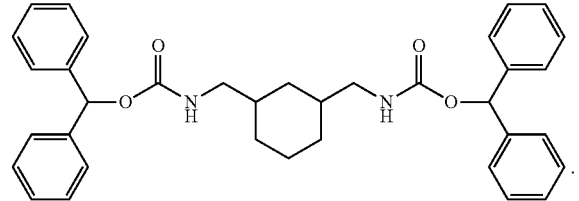

(benzhydrol)$_2$BIMC

2. The phase change ink of claim 1, further comprising a colorant selected from the group consisting of a pigment, dye, and mixtures thereof.

3. The phase change ink of claim 1, wherein the crystalline/amorphous ratio is from 60:40 to 95:5.

4. The phase change ink of claim 1, wherein the amorphous compound has a viscosity of less than 100 cps at a temperature of 140° C.

5. The phase change ink of claim 1, wherein the amorphous compound has a viscosity of greater than $1\times10^5$ cps at room temperature.

6. The phase change ink of claim 1 having a viscosity of less than 15 cps in a jetting range of from about from 100° C. to 140° C.

7. The phase change ink of claim 1 having a viscosity of greater than about $10^6$ cps at room temperature.

8. The ink in claim 1, wherein the phase change ink crystallizes in less than 15 seconds.

9. The phase change ink of claim 1, wherein the crystalline compound is present in an amount of from 60 percent to 95 percent by weight of the total weight of the phase change ink.

10. The phase change ink of claim 1, wherein the amorphous diurethane compound is present in an amount of from 5 percent to 40 percent by weight of the total weight of the phase change ink.

* * * * *